April 20, 1937. B. S. MELTON 2,077,707

ELECTROMAGNETIC PROSPECTING METHOD

Filed Aug. 1, 1933

Inventor
B.S. MELTON.
Jesse R Stone
Lester B. Clark
By
Attorneys.

Patented Apr. 20, 1937

2,077,707

UNITED STATES PATENT OFFICE 2,077,707

ELECTROMAGNETIC PROSPECTING METHOD

Benjamin Starr Melton, Houston, Tex.

Application August 1, 1933, Serial No. 683,128

3 Claims. (Cl. 175—182)

The invention relates to an improvement in electrical subsurface prospecting to determine the character and location of geological formations by transmitting to the earth electrical impulses and detecting the reflected or refracted portions of such impulses.

The invention is predicated upon the knowledge that electric and electromagnetic waves are known to travel at different velocities in different media and to obey the laws similar to the laws which have been discovered as affecting the travel of light. Refraction and reflection of the electric and electromagnetic waves will take place under conditions analogous to the reflection and refraction of light waves. When an electromagnetic wave is transmitted to the earth a portion of its energy will be reflected from a surface of discontinuity under proper conditions and, inasmuch as the average speed of propagation of the wave and the elapsed time for the wave to travel to the surface of discontinuity and to return to the earth's surface may be measured, the depth to the surface of discontinuity may, therefore, be determined and its location quite accurately ascertained.

This invention differs substantially from all other electrical methods in that the time of travel of the electrical waves is to be measured and the invention practiced in ways similar to those now employing sound or seismic waves thru the earth.

The general problem may be said to compose two phases, the first of which is to identify the reflected or refracted wave from other and more direct waves which may be caused when the energy is transmitted. The second phase is the timing of reflected or refracted waves from the instant they are originated at the source until they are picked up by the detector.

The velocity of electric waves is understood to be a function of the electric constants of the media thru which the wave is propagated.

The term electric wave will be used thruout this description and when used it is to be understood as relating to either an electric wave or an electromagnetic wave which latter terms may be used interchangeably as employed in the publication Electric Oscillations and Electric Waves (1920) by George W. Pierce (McGraw-Hill). The term electric wave paths and electric paths are understood to include either reflected or refracted wave paths.

It is one of the objects of the invention to transmit to the earth an electric wave which may pass thru the earth and be reflected and refracted by the different geological formations encountered so that the reflected or refracted portions thereof may be picked up at one or more of spaced points on the earth's surface. The elapsed time required for the wave to travel from its source and return to the detector can be recorded as an indication of the distance to the geologic layer which causes the reflection and/or refraction of the wave.

Another object of the invention is to transmit an electric wave to the earth and to initiate the operation of a timing apparatus by that portion of the electric wave which travels through air, so that such apparatus will be in operation to receive that portion of the wave which is reflected or refracted by a surface of discontinuity within the earth so that a comparison of the relative times between these plurality of spaced points may be compared to determine the distance to the surface of discontinuity.

Another object of the invention is to discharge from an impulse generator at periodic intervals an electric charge so that the portion of such charge which is reflected or refracted from any surface of discontinuity may be picked up at a plurality of spaced points in order to determine the distance to the media which has caused the reflection or refraction.

Another object of the invention is to supplant the mechanical waves of the seismic method of geological prospecting with electric waves.

Another object of the invention is to chart certain electric wave paths thru the earth with a view of interpreting the geology.

Other and further objects of the invention will be readily apparent when the following description is considered in connection with the accompanying drawing wherein.

In view of the fact that electric waves obey the laws of optics an illustration of the reflection of the waves should be sufficient to indicate the object of the invention so that the natural alternatives employing refractions suggest themselves.

Figure 1:
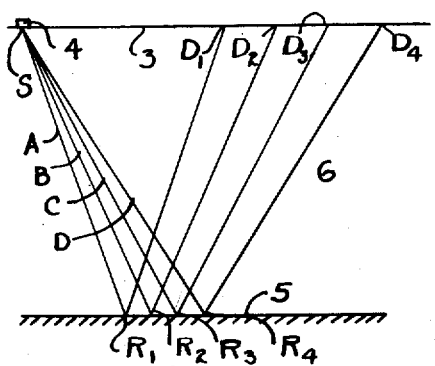
Fig. 1 shows a diagrammatic arrangement illustrating the paths of travel of the waves from the source of a plurality of spaced points so that the distance to the reflecting layer may be determined.

By having reference to Fig. 1 of the drawing, S indicates a source of energy which is to be transmitted to the earth, the surface of which is indicated at 3. This source of energy may be of any desired type and will involve the apparatus illustrated diagrammatically at 4.

One form of practicing this invention is illustrated in Fig. 1 where the impulse is transmitted to the earth at the point S. Of course, waves will radiate in all directions from the point S and a few such waves have been indicated by the lines A, B, C and D. Each of these waves will strike the surface of discontinuity indicated generally at 5, which may be a layer or geological formation which is different from the formation 6 existing between the earth's surface 3 and the layer 5. The waves A, B, C and D will strike the layer 5 at the points $R_1$, $R_2$, $R_3$, and $R_4$, respectively, and be reflected from the layer 5 at the same angle at which they approach this reflecting layer. Each of these waves will then return through the medium 6 above the layer 5 and be received by the detectors $D_1$, $D_2$, $D_3$, and $D_4$, respectively.

In addition to these waves, many other waves emanating from S follow various paths to reach the four detectors, previously, simultaneously with, and later than the four particular waves above described. The four reflected waves, A, B, C and D arrive at the surface almost simultaneously, which fact is the criterion by which these reflected waves are selected from this maze of incoming waves.

With the information obtained from the detectors as to the time of arrival of the waves and knowledge of the distances between the source S and the several detectors it is possible to ascertain definite information as to the velocity of the waves detected as well as the distance the wave has traveled. This data, when correlated and interpreted indicates the nature and depth of the different geological formations which have been encountered.

The apparatus 4 may take different forms, which come within the general classification of electric wave or impulse generators.

(1) One general type of such generator operates on the basis of a discharge of a quantity of electricity at high potential into a point electrode in the earth at the selected source for the electric waves.

This source of high potential may be condensers charged in parallel and discharged in series; or it may be any of the recently developed high potential generators such as the moving belt types and the high velocity powder types.

The problem of calculation of wave paths is simplified where the origin or source of the wave constitutes a point, because the timing and measurements there have a definite starting point.

(2) Another general type of such generators are those where the wave is propagated from antennas of the various types used in radio practice or from a coil of wire thru which a suitable current is caused to flow.

Still another type of generator might consist of a suitable current being caused to flow between two electrodes in the earth, such as a battery connected thru a switch to two electrodes.

As previously stated, any type of apparatus may be used to transmit the desired waves.

The detectors $D_1$, $D_2$, $D_3$, and $D_4$, may be of a type to convert either electrostatic or electromagnetic wave energy into electric currents which may be directly used for interpretation. This same current may be picked up conductively from the earth.

In general it will be desirable to amplify this current before feeding it to the final indicating instrument. The indicating instrument may be a suitable oscillograph or some phase-balancing device. In particular a cathode-ray oscillograph may be employed because it will handle a wider band of frequencies than mechanical oscillographs.

Figures 6, 7:
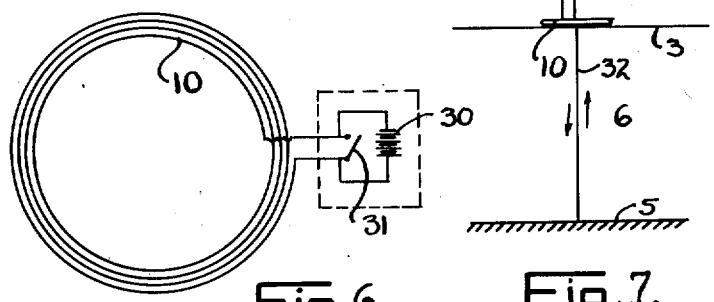
Fig. 6 shows one form of apparatus which may be used to transmit the energy to the earth in order to practice the invention and illustrates the coil by which the energy is to be passed into the earth.
Fig. 7 shows a form of apparatus for practicing the invention wherein the wave will be received at substantially the identical point from which it was discharged and by the same apparatus which served to transmit the charge, so that the computation to determine the location of the reflecting or refracting layer may be more easily determined.

For purposes of description herein, electromagnetic pickup will be considered and may consist of a coil of wire 10, such as seen in Fig. 6. This wire will be insulated and electrostatically shielded and may be buried a short distance beneath the surface of the earth. The coils may be oriented so that the maximum sensitivity directional effect will be downward at the approximate angle from which the reflected wave is expected.

In order to record the character and time of the incoming electric waves the several detectors may be connected to high speed oscillographs probably of the cathode-ray type and the energy received at the detectors may be amplified if required, it being intended that the energy received will serve to cause a deflection of the cathode ray in the oscillographs so that the deflection of the ray will be proportional to the energy of some derivative of the energy received.

Figure 2:
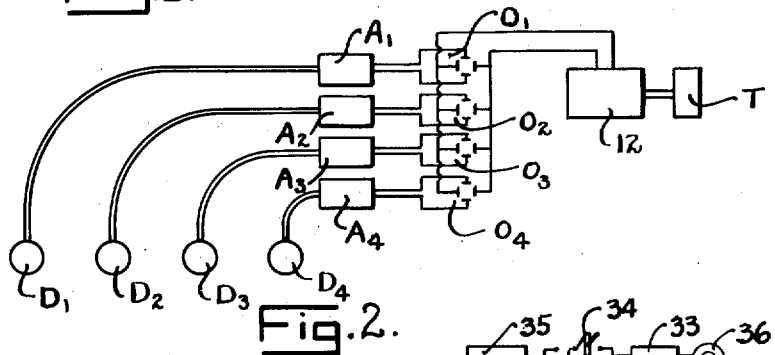
Fig. 2 shows one arrangement of the pick-up apparatus wherein a plurality of detectors have been arranged at spaced points in order to record the time of arrival of the reflected waves at each of these spaced points so that the difference in time required for the wave to travel to the reflecting surface and to be received in each detector may be determined and compared.

For purposes of illustration, attention is directed to Fig. 2 where the detectors $D_1$, $D_2$, $D_3$ and $D_4$ are illustrated. The oscillographs $O_1$, $O_2$, $O_3$ and $O_4$ are fed from the amplifiers $A_1$, $A_2$, $A_3$, and $A_4$ connected in the lines so as to amplify the energy picked up by each of the pick-up coils. It is intended that each of these oscillographs will have one pair of their deflecting plates connected to a sweep circuit for the purpose of producing a time axis, so that the same time axis can be used in each of the several oscillographs in each of the several detectors. Thus the same sweep circuit, which is indicated diagrammatically at 12, will serve to operate the time axis deflecting plates of each of the four oscillographs shown.

Connected to the sweep circuit 12 is the timing apparatus T, which causes the sweep circuit to start the time axis at the proper instant in order that it may be in operation to show the precise time when the wave is picked up by each of the pick-up coils. The timing may be operated in various manners as will be later described.

The speed of propagation of the waves from the point S above the surface of the earth through air will, of course, be much greater than the speed of propagation of the waves through the earth. This fact provides a convenient method of timing the starting of the time-axis of the oscillographs because the timer T may be connected to a circuit which will pick up the energy traveling through the air from the impulse generator 4 to the receiving position or the timer T. If desired, a transmission line might be used from the source S to the timer.

Figure 3:
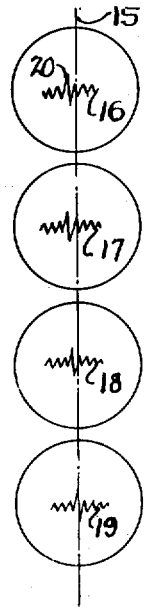
Fig. 3 shows the patterns which may be received upon the recording apparatus to indicate the time of arrival of the wave at the detecting apparatus positioned at the spaced points.

One form of the wave patterns which may be received under the above described conditions by the oscillographs are illustrated in Fig. 3. The vertical line 15 illustrates an instant of time and the irregular lines 16, 17, 18 and 19 illustrate the magnitude of the waves received by the detectors D1, D2, D3 and D4, respectively. It will be noted that the maximum vibration illustrated at 20 on the line 16 was received previous to the maximum intensity on any of the other patterns 17, 18 or 19, it being considered that time is traveling to the right as viewed in Fig. 3.

It is understood that this maximum shown here is merely an illustration of one possible case where the reflected wave is large compared to the other incoming waves, or where these waves reenforce each other according to the well known laws of optics. Interference may occur in which event a minimum may be the criterion by which the reflected wave is determined.

In this manner the time required for the waves to travel along the lines $SR_1D_1$, $SR_2D_2$, $SR_3D_3$, and $SR_4D_4$ can be observed from the patterns as an indication of the distance which these waves have traveled from the source S. This information is obtained by measuring from the starting point of each pattern and knowing the rate of sweep which gives the time of arrival of the reflected wave with respect to the time of arrival of the direct wave through the air. It is desirable that these patterns persist for visual or photographic observation and in order to make them persist on the record for visual observation they should occur at least as often as sixteen times per second, which with the normal persistence of vision will give the impression of a steady pattern.

If this system of observation requiring persistence of vision is employed, then the energy generation at S in Fig. 1 must supply similar impulses of identical magnitude at the desired intervals, say sixteen per second.

If desired, another system of timing measurement may be applied in practicing the invention by the following means. Cathode ray oscillographs in addition to the deflecting plates or coils are provided with a means for focusing the ray on a fluorescent screen or upon a moving film of some type. Focusing devices of this sort sometimes embody a variation in filament temperature or variation in gas pressure within the tube, but in the more recent types of apparatus a charged cylinder or another coil within the tube may be provided. With devices of this type a small change in the voltage or current applied to the focusing device will serve to bring the rays in or out of focus. It is intended to take advantage of this focusing of the rays to interrupt the continuity of the pattern at certain definite time intervals by changing the focusing voltage.

Figure 4:
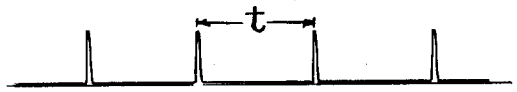
Fig. 4 is a graph of the wave form of the current or voltage to be applied only for timing purposes to the cathode ray oscillograph which will be described further in this application.

If the potential applied to the focusing device of the cathode-ray oscillograph has a voltage-time characteristic as illustrated in Fig. 4, then the spot on the screen will be thrown out of focus at intervals $t$. This would give a Lissijou figure such as Fig. 5 when the pattern would vanish every time the beam of electrons in the tube was not accurately focused, such as at the point 23.

Figure 5:
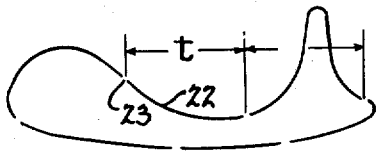
Fig. 5 is a graph formed by operation of the apparatus and showing the broken line to indicate the time interval.

With the pattern shown in Fig. 5, where the line 22 is irregular, the break 23 will occur periodically at the end of each time interval $t$ so that the variation in the wave pattern for each period of time can be easily determined.

If the voltage is made of a very high frequency so that $t$ is a very short interval, we have an accurate means of measurement of very short time intervals and because of the fact that such a voltage may be applied to the focusing device of the several cathode-ray oscillographs, there is thus presented a time arrangement which is synchronized for the several tubes. It is intended that the timing device T may be caused to supply a large impulse to the time dividing voltage so as to start the first time dividing impulse at the same point on each pattern as a zero from which to measure the elapsed time illustrated by that pattern.

Another manner of practicing the invention is illustrated in Figs. 6 and 7, and may be designated as the vertical reflection method and is quite simplified because it is intended that the reflected waves will travel the same path as the incident waves. In practicing this method, the electric or electro-magnetic wave transmitted to the earth will travel vertically downward until it strikes a reflecting layer. This is seen in Fig. 7 where the reflecting layer is indicated at 5, the earth's surface at 3, and the formation being traversed at 6. This method is simple because the transmitting and the detecting devices can be located at essentially the same spot. Figs. 6 and 7 show an apparatus arranged so that the wave may be transmitted and picked up by the same coil. This simplifies the method considerably because the rate of travel of the reflected wave will be the same as the rate of travel of the incident wave as both waves will traverse identically the same medium. This enables one to determine the average mean velocity of travel because the elapsed time from transmitting the impulse until the wave is received can be accurately determined, and further because in this case it is not necessary to provide a plurality of detectors to make sure that the wave received is a reflected wave.

The apparatus shown in Fig. 6 can be used as the sending apparatus 4 of Fig. 1, independently of any pickup or detector apparatus. It may, however, be used in the form of the invention shown in Fig. 7 so that the coil 10 serves both as a radiator and a detector. The wave given off by the coil 10 may be provided in any desired manner. One apparatus for creating such wave is illustrated in Fig. 6 where the coil 10 is shown in plan view as having been arranged in connection with the battery 30 and having a short circuiting switch 31 in the line. Thus, if the switch 31 is open a current will flow through the coil 10 and when the switch 31 is closed the circuit will be short circuited so that the current will drop to zero in the coil. An electromagnetic wave is thus sent out along the line 32, which is shown in vertical position and extended from the earth's surface 3 to the surface of discontinuity or reflected layer 5.

A portion of the wave striking this surface 5 will be reflected and in this vertical reflection method will retrace the vertical path 32, so that it will be picked up by the coil 10. In order, however, that the reflected wave will be conducted to the detector 33, a switch 34 has been provided. This switch is connected to the radiating apparatus 35 at the time the wave is sent out through the coil 10. Immediately after the wave has been radiated however, then the switch 34 is disconnected from the radiator 35 and moved over to the detector 33 so that when the reflected wave returns to the coil 10 it will be transmitted to the detector 33 and to the oscillograph 36. The switch 34 may be known as a transfer switch and while illustrated diagrammatically as merely a mechanical switch it would, of course, be necessary to accomplish a very high speed transfer of the switch and, in all probability, a vacuum tube device would be desirable.

The detector 33 and oscillograph 36 may be similar to those previously described. It is intended that the starting of the timing apparatus in this form of the invention may be the same as described in connection with Fig. 1.

The description heretofore given relates particularly to the reflection of waves but it is intended that the invention may apply equally as well to refracted waves. The advantage of the use of refracted waves lies in the fact that the wave first arriving at the detector, which is easily recognized on the oscillogram may not be the wave which has traveled the shortest distance path but may be a wave which has traveled the shortest time path by traversing a greater part of its way in a deeply buried high-speed geologic formation. Hence when the identity of the waves as to time and distance is ascertained it furnishes a means of charting the formations which have been traversed. This again is drawing somewhat of an analogy between the well known means of seismic prospecting and this invention when electric waves are being substituted for the mechanical waves.

It is well known that in seismic prospecting the mechanical wave set up when traveling the shortest time path in homogeneous earth is a curve, due to the fact that the velocity of the mechanical wave increases with the depth the wave travels below the surface of the earth. This increase in velocity with depth is due to the increase in elastic constants with the depth at which the wave is traveling through the earth. The curve of the mechanical wave as in a seismic case is concaved upwardly whereas for an electric or electromagnetic wave indications are that the path through substantially homogeneous earth will be a substantially straight line, because of the fact that the conductivity, dielectric constant and the permeability should not increase with the increasing pressure or compression of the earth material. These three factors, however, may change with the moisture content and mineral substances encountered. Another factor which must be considered in this electrical prospecting is the fact that electric waves of different frequency travel with different velocities and in order to simplify the problem a definite frequency or band of frequencies should be selected at the receiving end in order to determine the velocity at which the impulse waves have traversed the medium. When a definite frequency or band of frequencies is selected at the receiving station a great deal of additional information is then available because of the nature of the shortest time path, which path may be different for different frequencies. It is of course possible to combine the various incoming signals of the several different frequencies which may have different shortest time paths, in the same receiving apparatus.

Figure 8:
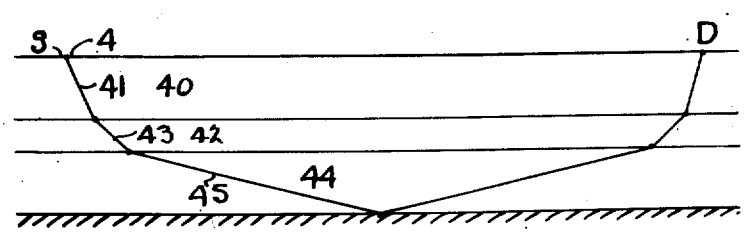
Fig. 8 shows a diagrammatic view of a refraction-reflection path of the shortest time where the media are different.

Fig. 8 of the drawing shows a diagrammatic illustration of a refraction-reflection path of shortest time wherein the generator or sending apparatus is located at the point S, which is the source of energy. For purposes of computation, the wave will traverse the layer 40 of material along the line 41 at a velocity $V_1$. The medium 42 will be traversed by the wave along the line 43 at a velocity $V_2$, whereas the medium 44 will be traversed along the line 45 at a velocity $V_3$, and it may be assumed that $V_1$ is less than $V_2$, $V_2$ is less than $V_3$. If, however, $V_1$ is greater than or equal to $V_2$, and $V_2$ is greater than or equal to $V_3$, the shortest time passed will be along the surface of the earth. It is possible that the permeability and dielectric constant of the medium being traversed will be greater for the deeper layers so far as the usual geological formations are concerned, so that the velocity of the wave traveling through these deeper layers will be less and, therefore, the refracted waves can never return to the surface of the earth, except by reflection.

In connection with the velocities of propagation of the electromagnetic waves to the earth, it appears that the permeability and dielectric constant will not greatly affect the velocity of propagation where the frequency is below one hundred thousand cycles per second. With this information at hand and a knowledge of the average resistance of the earth material, sufficient information is present to predict the average velocity of the wave. The resistance of the earth may be readily measured by any one of the several direct current methods. Even down to great depths, under favorable conditions, the velocities may be predicted with fair accuracy. Reasonable assumptions as to the relative characteristics of different earth formations indicate that the velocity of propagation of the elecric waves through oil sands may be sufficiently high compared to the velocity through either average earth, saturated earth, or salt water sands, to differentiate oil sands from other geologic structures by refraction methods such as those heretofore described.

For electric waves of frequencies below ten thousand cycles per second traversing the earth in the geologic forms which are usually found, a sufficiently close approximation for velocity is given by:—

$$\text{Velocity} = V = \sqrt{\frac{\rho f}{\mu}}$$

where $\rho$ is the resistance of a section of one square centimeter in cross section and one centimeter long, expressed in abohms (ohms$\times 10^9$), $f$ is the frequency in cycles per second and $\mu$ is the permeability.

If the waves traverse media of unusually high values of either $f$, $\rho$, or $\mu$, such as might be encountered with iron ore, the well known exact equations for velocity may be employed, instead of the above approximation.

A transient wave may be considered for purposes of analysis as being made up of a number of sinusoidal waves of different frequencies and phase relationships. Inasmuch as the characteristics of propagation of the component waves are known, it is then possible to determine the characteristics of the propagation of the transient wave. It must be considered, however, that the higher frequency components travel at greater velocities than the lower frequency components, so that the result will be a distortion of the original transient wave, and there will be further distortion due to the fact that the higher frequency components are attenuated to a greater degree than the lower frequency components for a given distance of propagation. Thus the amount of distortion may be used as a measure of the distance of propagation. When this information is considered in addition to the method heretofore described the time of travel of some portion of the transient wave from the generator to the detector may be obtained.

With a view of improving the conditions for obtaining measurement of the speed of propagation, it may be advisable to provide within the receiving or detector apparatus some means of compensating for the attenuation of the higher frequencies of the transient wave. By the term compensation, is meant the factor by which the amplitude of the high frequency portion of the wave at the receiving station would have to be multiplied to give that portion of the wave the same amplitude relative to the low frequency portion as it had when it was emitted from the transmitting station.

Inasmuch as the relative attenuation at different frequencies is a function of the distance from the generator and also of the resistance of the medium being traversed, any compensation to be made would have to be adjustable in order to perfectly compensate for the varying conditions which the wave encountered. It seems likely that an approximate compensation would be of some advantage and especially so if the degree of compensation were known from the characteristics of the apparatus used.

For purposes of illustration, a theoretical table of approximate compensating values has been devised which are as follows:

| Distance of transmission, in feet | 500 | 1000 | 2000 | 8000 |
|---|---|---|---|---|
| 10 cycles per second | 1.1 | 1.21 | 1.47 | 4.76 |
| 100 cycles per second | 1.36 | 1.84 | 3.38 | 131. |
| 1000 cycles per second | 2.6 | 6.8 | 46.2 | 4,540,000. |

The above values have been determined by assuming an earth resistivity of ten thousand ohm centimeters. Another means of compensation for attenuation would be to provide two or more tuned circuits at the detector for the particular frequencies rather than for a wide band of frequencies. The two tuned circuits could be individually adjusted to compensate for attenuation and their relative times of operation would give the distance of signal transmission, if the characteristics of the medium being traversed were known.

While several forms of the invention have been shown and described, it is intended that the invention may be practiced with various types of apparatus and that either or both reflection and refraction is to be considered.

What is claimed is:

1. A method of electrically locating buried geological formations including passing into the earth a series of independent periodic electrical impulses to initiate electrical earth waves that may be detected at points in the area under observation, timing such impulses to occur at a minimum rate of sixteen times per second so as to create visual patterns of the reflected and refracted impulses which will lie within the normal persistence of vision, and receiving and forming visual patterns of the reflected and refracted earth waves at a point of observation whereby the time of travel of said waves may be visually obtained.

2. A method of electrically locating buried geological formations including passing into the earth a series of independent periodic electrical impulses to initiate electrical earth waves that may be detected at points in the area under observation, timing such impulses to occur at such rate that visual patterns of the reflected and refracted impulses will lie within the normal persistence of vision, determining the time of travel of the earth waves by receiving and forming visual patterns of the reflected and refracted earth waves at a point of observation.

3. An apparatus for geological prospecting including means for establishing a series of independent periodic electrical impulses in the earth, a coil, a detector for detecting electrical impulses in the earth, and means for successively connecting said first mentioned means and said detector with said coil whereby the series of electrical impulses may be transmitted to the earth and resulting impulses may be picked up and conveyed to said detector.

BENJAMIN STARR MELTON.